(12) United States Patent
Dietrich et al.

(10) Patent No.: US 6,583,783 B1
(45) Date of Patent: Jun. 24, 2003

(54) PROCESS FOR PERFORMING OPERATIONS USING A 3D INPUT DEVICE

(75) Inventors: Johannes Dietrich, Gilching (DE); Bernd Gombert, Grafrath (DE); Volker Senft, Germering (DE)

(73) Assignee: Deutsches Zentrum fur Luft- und Raumfahrt e.V., Köln (DE)

( * ) Notice: Subject to any disclaimer, the term of this patent is extended or adjusted under 35 U.S.C. 154(b) by 0 days.

(21) Appl. No.: 09/371,130

(22) Filed: Aug. 10, 1999

(30) Foreign Application Priority Data

Aug. 10, 1998 (DE) ............ 198 36 047
Oct. 19, 1998 (DE) ............ 198 52 573

(51) Int. Cl.$^7$ ............................... G09G 5/08
(52) U.S. Cl. ............... 345/158; 345/184; 73/862.44
(58) Field of Search ................ 345/156–158, 345/184; 73/862.44

(56) References Cited

U.S. PATENT DOCUMENTS

| | | |
|---|---|---|
| 4,763,531 A | 8/1988 | Dietrich et al. ......... 73/862.44 |
| 5,335,557 A | 8/1994 | Yasutake |
| 5,543,591 A | 8/1996 | Gillespie et al. |
| 5,666,473 A | 9/1997 | Wallace |
| 5,757,360 A | 5/1998 | Nitta et al. |
| 5,864,333 A * | 1/1999 | O'Heir ............... 345/157 |
| 6,024,576 A * | 2/2000 | Bevirt et al. ........... 434/262 |

* cited by examiner

Primary Examiner—Richard Hjerpe
Assistant Examiner—Francis Nguyen
(74) Attorney, Agent, or Firm—Browdy and Neimark, P.L.L.C.

(57) ABSTRACT

To trigger technical control operations and/or to trigger the execution of technical functions, a manually operated input device with a torque-force sensor is used. Pressure is exerted onto a user interface of this input device and results in the generation of a pulse, which is measured with the aid of the force-torque sensor and converted into a pair of vectors formed by a force vector and a moment vector. This vector pair is then checked to determine whether certain predefined characteristic pulse conditions have been met. If these predefined pulse conditions are identified as having been met, at least one technical control operation that is to be performed by means of the input device and linked to a certain object, and/or at least one technical function to be executed by means of the input device, is triggered by switching to an activation state.

11 Claims, 4 Drawing Sheets

PROCESS FOR PERFORMING OPERATIONS USING A 3D INPUT DEVICE

The present invention relates to a process for triggering technical control operations and/or for triggering the execution of technical functions using a manually operated input device with a force-torque sensor.

The invention furthermore relates to a system for carrying out this process.

Force-torque sensors of this type are known, for example from DE 36 11 336 C2 or U.S. Pat. No. 4,763,531. With the aid of this type of force-torque sensor, which is housed inside an input device, linear displacements or rotatory deflections can be measured and converted directly into translatory and rotatory motions or velocities of an object to be controlled. Automated machines, robots, manipulators or comparable systems, as well as 3D computer graphics may be controlled in this manner, for example.

U.S. Pat. No. 5,757,360 describes a process and an input device for a multi-dimensional input that is based on the recognition of movements and accelerations whereby a specific analog sequence of movements is identified in the form of a motion pattern from which motion commands are derived and sent to an animated graphic display. The motion patterns are recognized by means of a pattern recognition algorithm. General control commands are additionally generated as well.

From U.S. Pat. No. 5,666,473 a multi-dimensional position sensor is furthermore known, which has a multitude of pressure sensors provided on its surface.

It is the object of the invention to reliably and deliberately trigger specific technical control operations and/or an execution of technical functions by means of an input device with a force-torque sensor without having to fall back on stored pressure patterns, for example.

According to an inventive process for triggering technical control operations and/or for triggering the execution of technical functions using a manually operated input device with a force-torque sensor, pressure is exerted on a user interface of the input device, as a result of which a pulse is generated, which is measured with the aid of a force-torque sensor and converted into a pair of vectors formed by a force vector and a torque vector. This vector pair is subsequently checked to determine whether certain predefined characteristic pulse conditions are met or not met. As soon as the predefined pulse conditions are identified as having been met, at least one technical control operation to be performed by means of the input device and assigned to a certain object to be controlled, and/or also at least one technical function to be executed by means of the input device is triggered by switching to an activation state.

According to an advantageous improvement of the inventive process, the pulse is furthermore recognized as a pressure pulse based on certain predefined characteristic pulse conditions, so that at least one control operation that is assigned to a certain object and to be carried out by means of the input device, and/or at least one technical function, can then be triggered by switching to the activation state. According to a further preferred improvement of the invention the pulse is generated through pressure exerted in a bounded pressure area on the user interface of the input device. It should be noted that the user interface may also have a plurality of such pressure areas.

According to the invention, the pulse may preferably also be generated on the user interface in such a manner that it is oriented towards a measuring center provided in the force-torque sensor. In accordance with the invention, the force vector and the torque vector may be furthermore evaluated across a predetermined time segment to determine whether the certain predefined characteristic pulse conditions are precisely met. Furthermore, the time progression of the force and torque vector may also be evaluated as to whether the predefined pulse conditions are met.

The maximum possible number of pressure areas on the user interface and, accordingly, also the corresponding number of activation states that can be attained by switching, is limited by the accuracy of a force-torque sensor, as well as, if applicable, also by the size of the user interface.

In accordance with the invention, in a preferred system for carrying out the process the input device with a force-torque sensor has a user interface on which at least one area for entering a pressure pulse is defined and that area is assigned to a very specific object. The input device furthermore incorporates a device for evaluating and identifying a pulse measured by means of the force-torque sensor and converted into a corresponding force and torque vector pair. The device for evaluating and identifying a pulse converted into a vector pair may also be housed outside the input device and connected to same.

To be able to easily identify the area defined for entering a pressure range on a user interface, or to be able to identify and distinguish a plurality of defined pressure areas on a user interface, the pressure area or areas may have a special design or may be made identifiable and/or also provided with appropriately implemented and optionally raised surfaces or colored reference symbols.

According to the invention, an input device with a force-torque sensor can be used both as a switch and at the same time also for the execution of technical control operations and/or functions. A preferred input device with a force-torque sensor is an opto-electronic setup described in U.S. Pat. No. 4,763,531, which can be used for the simultaneous input of six components in and around the rotational axes of a Cartesian coordinate system.

The system for carrying out the inventive process may be used to control objects such as navigation systems, particularly those that use data received via GPS reception. An intuitive spatial control in the three translatory and the three rotatory directions can thus be advantageously transferred, for example, to the navigation on maps.

The objects may furthermore also be real and/or virtual multi-media systems, such as a video recorder with an integrated cutting and editing workstation, for example, in which the input device with a force-torque sensor may be used as a switch and subsequently for the execution of technical control operations and/or functions.

A system for carrying out the inventive process may also be used to control a real or virtual mixing or control desk, for instance for controlling the development of novel color, light and sound compositions. In this application, the intuitive spatial control in the three translatory and the three rotatory directions can advantageously be transferred to a continuously adjustable spatial mixing or control of a large number of parameters (3D cursor).

A system for carrying out the inventive process may also be used to control an information center from which a navigation system, three-dimensional (3D) weather maps, radio and television sets, the Internet, a monitor cursor, or the like may be controlled, or personal identification data may be transmitted, via a monitor or a telephone, for example. With this application it is possible to use the intuitive spatial control in the three translatory and the three rotatory directions for the positioning and also for the navigation of menu fields.

In all of the above applications, supplementing command and menu functions may additionally also be directly activated and selected via the operating elements. This avoids complicated nesting levels, for which many times the number of switches and operating elements, e.g., potentiometers and the like, must be used.

According to the invention an input device with a force-torque sensor can, therefore, be used not only for an analog control of up to six components, namely the three translatory and the three rotatory components, but an input device of this type according to the invention can at the same time also be used as a digitally operating switch to trigger technical control operations assigned to one or more objects, and/or to optionally trigger subsequent technical functions, by switching to activation states.

The system for carrying out the inventive process can, therefore, in a particularly advantageous manner, be used as a type of multifunctional switch in a manner whereby switching operations are identified as such and this results in technical control operations and/or technical functions being executed immediately afterwards.

According to the invention, four physically separated pressure areas, for example, which may be assigned to four different objects, may be defined on a user interface of an input device. Up to six different control operations and/or technical functions can be triggered on each of these objects and subsequently executed after the given object has been switched to the activation state. Or, in other words, an input device with a force-torque sensor designed according to the invention may be used in the above example to execute a total of 24 different technical control operations and/or functions on four different objects.

On the basis of an input device with a force-torque sensor, a kind of multi-functional switch has thus been created in accordance with the invention that operates without any kind of contacts, i.e., contactless and thus perfectly wear-free, and, accordingly, has an extremely high service life. On top of that, with this type of input device with a force-torque sensor, any occurring malfunctions, like shock effects or vibrations, can easily be measured and subsequently filtered out.

The invention is described below based on a preferred system for carrying out the process. In the drawings.

Figure 1:
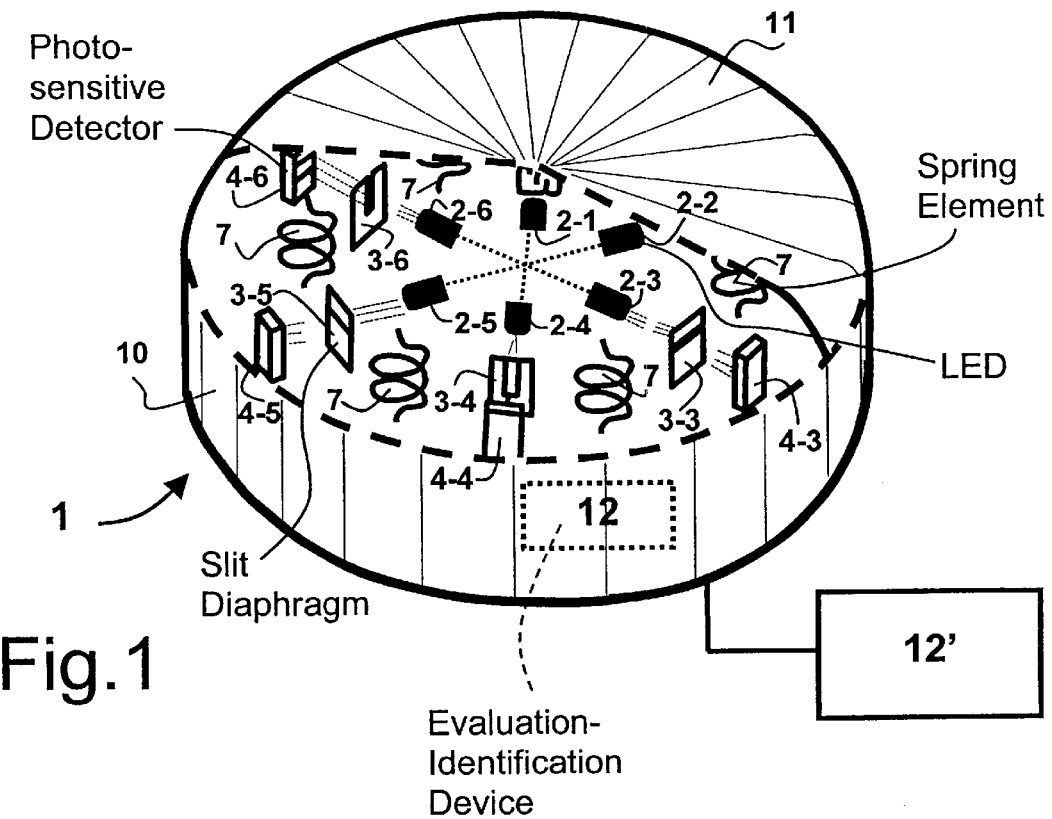
FIG. 1 is a schematic illustration of an input device with a partially cut open control cap.
Figure 2:
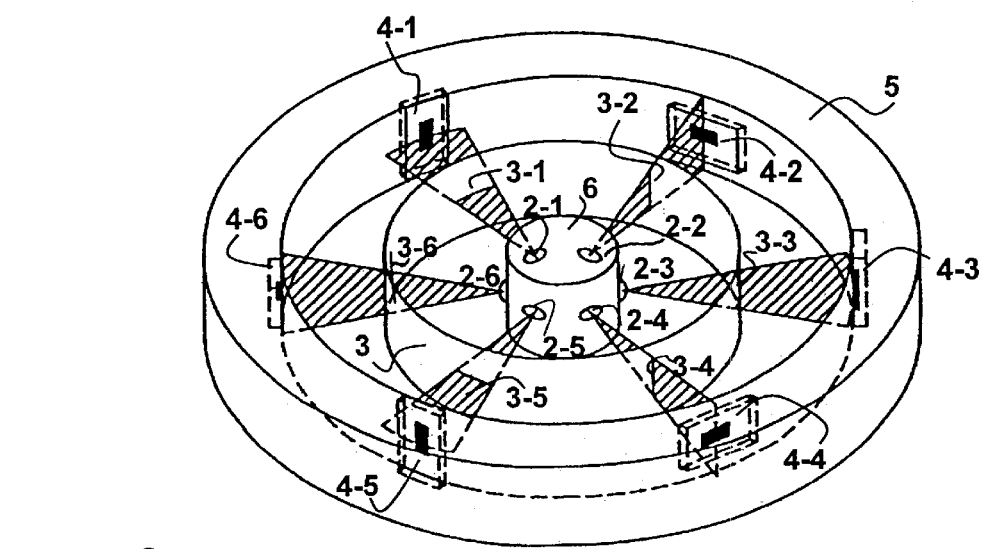
FIG. 2 is an opto-electronic setup housed inside the input device shown in FIG. 1.

Illustrated in FIG. 1 is a system for carrying out the process, comprising an input device 1 with a force-torque sensor in the form of an opto-electronic setup shown in a schematic illustration in FIG. 2. Furthermore, either a device 12 (indicated in FIG. 1 by a dashed line) for evaluating and identifying a pulse measured by means of the force-torque sensor and converted into a force and torque vector pair is provided in the input device, or an evaluation and identification device 12' with identical design and function (indicated by a solid line) may also be connected to the input device 1.

In FIG. 1 the input device has a control cap 10 which, in the shown embodiment, has a cylindrical shape with a preferably slightly arched user interface 11, which is shown cut open in FIG. 1 so that a portion of the schematically illustrated design of a schematically indicated force-torque sensor in the form of the opto-electronic setup is visible.

The opto-electronic setup, which is shown schematically in FIG. 2, has six light-emitting devices, preferably in the form of six light-emitting diodes 2-1 through 2-6, which are arranged in one plane. Each of these light-emitting devices has, at a fixed distance, a corresponding slit diaphragm 3-1 through 3-6. The design is such that adjacent slit diaphragms are formed offset from one another by 90° in a cylindrical ring 3 in such a way that the slit diaphragm 3-1, for instance, is oriented horizontally and the two adjacent slit diaphragms 3-2 and 3-6 are oriented perpendicular to the former.

FIG. 2 shows six photo-sensitive detectors 4-1 through 4-6 in a cylindrical ring 5 oriented according to their corresponding slit diaphragms 3-1 to 3-6. The ring 5 with the six detectors 4-1 to 4-6 is furthermore immovably attached to the inside of the preferably cylinder shaped control cap 10 of the input device 1. Since the six light-emitting diodes 2-1 through 2-6 in FIG. 2 are housed in a support device 6 (schematically indicated in the drawing as a cylinder) which, in turn, is housed stationary inside the input device 1, the ring 5, which is immovably attached to the control cap 10, with the six detectors is movable relative to the stationary array of the six diodes 2-1 through 2-6 and relative to the slit diaphragm ring 3 that is immovably connected to the former.

In a practical embodiment the stationary support device 6 schematically indicated as a cylinder in FIG. 2 may, for example, also be designed as a stationary disk, whose diameter corresponds approximately to the outside diameter of the ring 5 carrying the detectors 4, and which may be arranged above or below the ring 5.

Between the ring 5 and a disk-shaped support device of the above type, spring elements 7 (see FIG. 1) are provided, preferably in the form of helical springs, which are immovably connected by means of studs not shown in the drawing both to the ring 5, as well as to the disk-shaped support device. The helical springs 7 render the ring 5 carrying the detectors 4 movable, via the control cap 10, relative to the stationary array of the light-emitting diodes 2 and relative to the slit diaphragm ring 3, which is immovably connected to the former, in the direction of the three axes X, Y, Z of a coordinate system (see FIG. 3) and around these three axes, and it always returns into its original position after each displacement or angular rotation.

The at least six detectors 4-1 through 4-6 are arranged in one plane at equal angular distances from each other, i.e., at an angle of 60°, and incorporate the slit diaphragms 3-1 through 3-6 that are alternately oriented horizontally and vertically relative to this plane. As can be seen from the position of the individual slit diaphragms and the planes (emphasized in the drawing by hatching) that extend from the individual diodes 2-1 to 2-6, the axes of then individual position-sensitive detectors 4-1 to 4-6 are always oriented perpendicular to their corresponding slit diaphragms 3-1 to 3-6.

With the opto-electronic setup it has become possible to fully measure all six possible motion components, i.e., the three translatory movements in the direction of the three axes X, Y and Z (see FIG. 3) of a coordinate system and the three rotatory movements A, B, and C, around these three axes X, Y and Z. Since the control cap 10 is immovably attached to the ring 5 that carries the detectors 4, and since the ring, by means of the spring elements 7 (FIG. 1), is elastically connected to the stationary support device that carries the six diodes 2 and their corresponding slit diaphragms 3-1 to 3-6, the spring elements 7 hold the entire measuring system in the mechanical zero position when no commands are entered on the control cap 10.

The operating characteristics of the control cap can be modified within wide limits by varying the properties (particularly the stiffness) of the springs. If relatively soft spring elements are used, the input device 1 acts more like a path-sensitive sensor, whereas if harder spring elements 7 are used, commands are given more in the form of an exertion of forces and torques.

In the opto-electronic setup each position-sensitive detector furthermore has its own corresponding light source, which is controlled by a simple electronic controller. With the aid of this electronic controller, different detector sensitivities, different light-emitting diode efficiencies, tolerances in the electronic components, as well as temperature drifts, for example, are balanced automatically and quickly. This also makes is unnecessary to have an additional deviation control.

Figure 3:
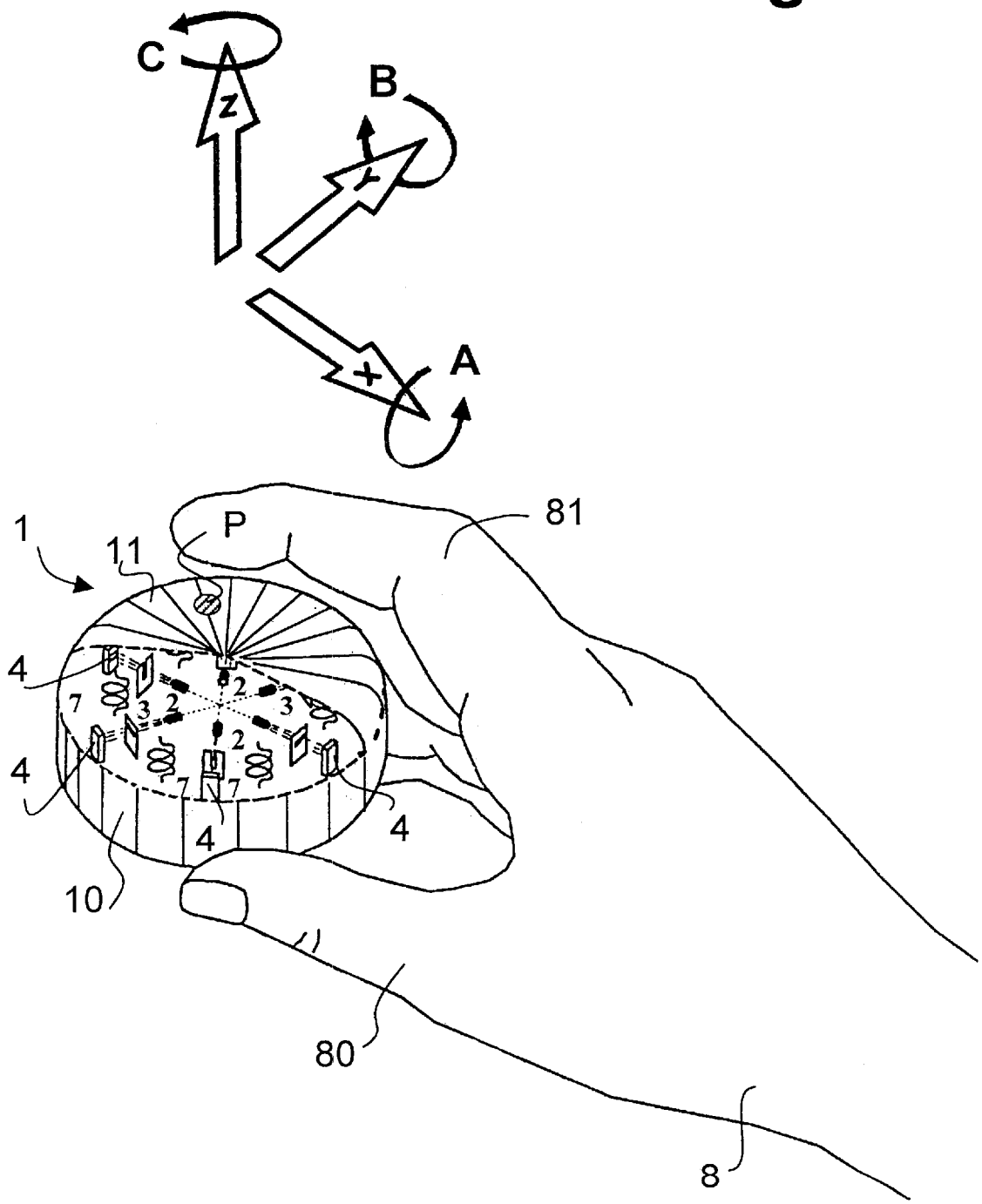
FIG. 3 is an illustration of an input device corresponding to FIG. 1 with an associated hand and, above it, schematically indicated force and torque vectors.

In FIG. 3 the input device 1, which corresponds to the one shown in FIG. 1, has a hand 8 associated with it in such a way that its index finger 81 is held in a position above a contact point P while the thumb 80 and the remaining fingers encompass the input device 1. In FIG. 3 force vectors, which extend in the direction of the three coordinate axes X, Y, Z, are indicated by arrows above the hand 8 that encompasses the input device 1, and the torque vectors A, B, C that can be generated around these respective axes are indicated by partial circles with arrow heads.

Figure 4A:
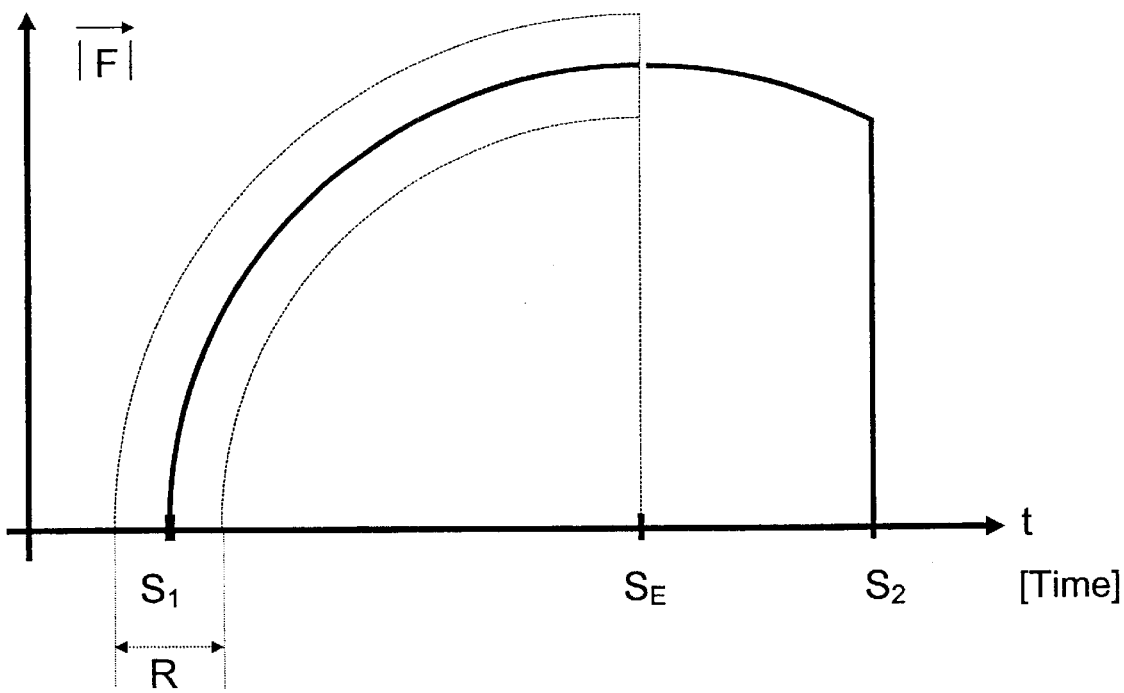
FIG. 4a is a pictorial schematic of a force vector curve.
Figure 4B:
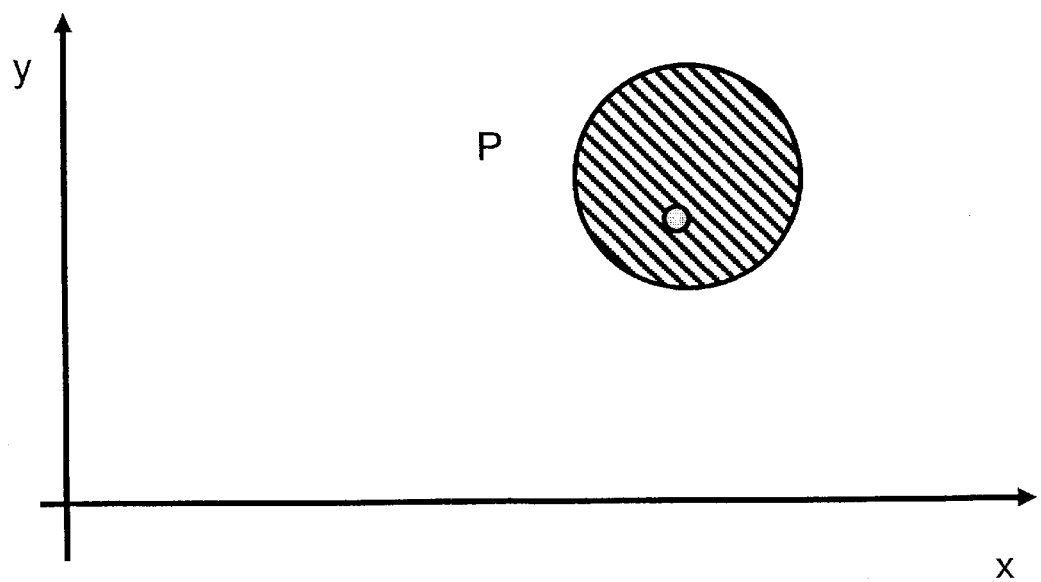
FIG. 4b is a pictorial schematic of a contact area projected into the x-y-plane.

FIG. 4*a* illustrates a progression during the switching to an activation state, referred to in the following as "switching operation", whereby at least one technical control operation that is to be executed by means of the input device 1 is triggered. In this illustration the time t has been entered onto the abscissa and the absolute value of a force |F| has been entered onto the ordinate. In FIG. 4*a*, $S_1$ indicates the beginning of such a "switching operation" and $S_2$ indicates the end of this "switching operation". $S_E$ denotes the point in time at which a generated pressure pulse has been identified by the input device 1 as a switching operation and evaluated as such. During the time segment between the beginning $S_1$ of the switching operation and the time $S_E$ at which the switching operation is identified as such, a force and moment vector pair generated by a pressure exerted, for example, on a contact point P in FIG. 4*b* and a resulting generated pressure pulse can be formed four times.

If the device 12 or 12' that is provided inside or at the input device 1 for the identification and evaluation of this type of pulse that has been converted into a force and moment vector pair, has determined that the values of the four measured vector pairs are within a predefined, relatively narrow tolerance range, the pressure exerted onto the user interface 11 and the pressure pulse generated as a result are identified at the time $S_E$ as a "switching operation" with the result that the control operation that corresponds to this "switching operation" and which is to be executed by means of the input device 1, is triggered. The tolerance range is indicated in FIG. 4*a* by broken lines that extend at a distance R parallel to the solid circular line, and in FIG. 4*b* by a circle with gray shading around the contact point P.

This is an example for one of the possibilities how a force and torque vector pair can be evaluated across a predefined time segment in order to ultimately determine that certain predefined characteristic pulse conditions have been met. The criterion that a "switching operation" has been triggered and not a control operation, consequently, is not the position of a contact point P or the fact that this contact point P has been contacted. Instead, the criterion that a "switching operation" has been carried out, and that this has resulted in the triggering of the control function assigned to a certain object, is the linking of the pressure exerted in the contact point to the resulting pair of force and torque vectors generated by means of the input device and possibly evaluated across a predefined time segment.

Figure 5:
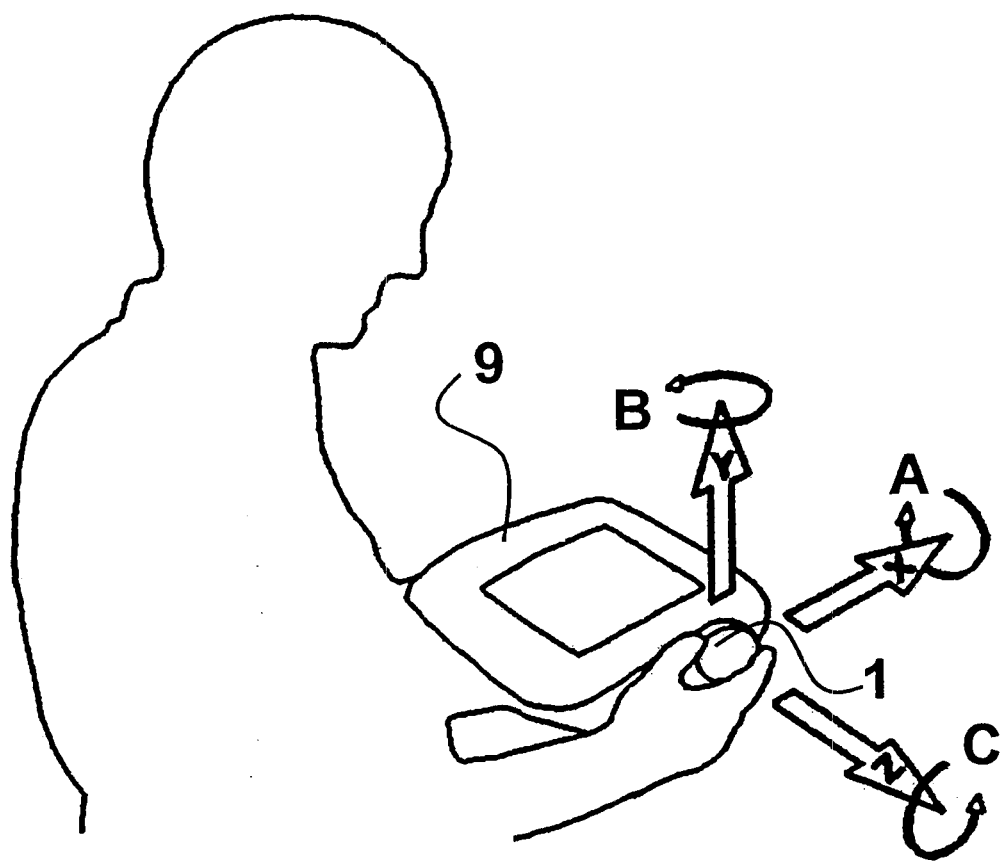
FIG. 5 is a schematic illustration of an information center with a person operating same.

In FIG. 5, a contour line indicates a person in the profile in front of whom an energy center is positioned, which is not marked in the drawing, above which a touch screen 9 is provided. FIG. 5 furthermore shows, to the right of the touch screen 9, which is connected to the information center, a system comprising an input device 1 and the force-torque sensor housed inside this input device 1.

Although not shown in FIG. 5, an identically designed and functioning system with an input device and force-torque sensor may furthermore also be provided, for example, on the left of the touch screen. Analogous to FIG. 3, the drawing furthermore shows force vectors marked with the designations of the three coordinate axes X, Y, Z, and around these force vectors torque vectors A, B and C indicated by partial circles with arrow heads.

What is claimed is:

1. A system for commanding technical control operations and/or for commanding execution of technical functions, said system having an input device comprising a force-torque sensor manually operated by a user interface and measuring linear displacements and/or rotary deflections and converting said displacements and/or deflections into a corresponding pair of force-torque vector signals being composed of a force vector signal and a torque vector signal, respectively, said user interface of said input device having at least one defined area assigned to a certain object to enter a pressure pulse which triggers a special switching operation and corresponds to pulse-shaped displacements and/or deflections of said user interface, said input device including a device evaluating and identifying such a pressure pulse by checking the pair of force-torque vector signals measured by said force-torque sensor in view of being within a predefined pressure pulse tolerance range and triggering said switching operation when the pair of force-torque vector signals is within the predefined pressure pulse tolerance range.

2. The system according to claim 1, wherein said device evaluating and identifying a pressure pulse is adapted to evaluate the time progression of the force and torque vector pair across a predefined time segment to determine whether the time progression of said predefined tolerance range has been met.

3. The system according to claim 1, wherein said at least one defined area defined of said user interface is provided with a corresponding design and/or with a reference symbol.

4. The system according to claim 1, wherein said input device including said force-torque sensor is used both for commanding technical control operations and/or execution of technical functions of an object and for triggering special switching operations concerning an object.

5. The system according to claim 1, wherein said input device has as the force-torque sensor an optoelectronic setup for the simultaneous input of six components in and around the three axes of a Cartesian coordinate system, in such a way that each of at least six light-emitting devices, which are arranged in one plane at equal angular distances from each other and each have a fixed slit diaphragm arranged in series, are arrayed opposite corresponding position-sensitive sensors, whose axes are oriented perpendicular to the direction of the slits of the corresponding slit diaphragms and wherein the light-emitting devices with their corresponding slit diaphragms and the position sensitive detectors are moved in opposite directions relative to each other and each light-emitting device corresponding to each position-sensitive detector is controlled by an electronic controller.

6. The system according to claim 1 applied to an information center with a touch screen.

7. The system according to claim 1 applied to a navigation system.

8. The system according to claim 7, wherein said navigation system is carried out with data received via GPS reception.

9. The system according to claim 1 applied to a real and/or virtual multi-media system.

10. The system according to claim 1 applied to a video recorder with an integrated interface.

11. The system according to claim 1 applied to a real or virtual mixing or control desk.

* * * * *